United States Patent Office 3,432,993
Patented Mar. 18, 1969

3,432,993
INHIBITION OF POLYMER DEPOSITION IN ACETYLENE EXTRACTION SYSTEMS
William J. Boyne and Jack R. Little, Baton Rouge, La., and Ulrich Wagner, Limburgerhof, Germany, assignors to Borden, Inc., New York, N.Y., a corporation of New Jersey, and Uniroyal, Inc., New York, N.Y., a corporation of New Jersey
No Drawing. Continuation of application Ser. No. 440,602, Mar. 17, 1965. This application Mar. 26, 1968, Ser. No. 716,228
U.S. Cl. 55—64    8 Claims
Int. Cl. B01d 11/00; C10h 23/00

ABSTRACT OF THE DISCLOSURE

This invention relates to the inhibition of polymer deposition in acetylene extraction systems, particularly in the selective extraction of acetylene from cracked gas obtained by partial combustion of hydrocarbon feedstocks, by adding to the solvent used to carry out the extraction an amount sufficient to substantially inhibit polymer deposition without affecting the solvent, of an antifouling agent selected from the group consisting of alkali metal salts of acids having a maximum disassociation constant of $10^{-4}$ for the first hydrogen and alkali metal hydroxides.

---

This application is a continuation of application No. 440,602, filed Mar. 17, 1965 and now abandoned.

Selective solvents are used to extract acetylene from gaseous mixtures obtained by high-temperature decomposition, such as arc cracking or thermal cracking, of hydrocarbon feedstocks, or by partial combustion of such feedstocks. However, the gaseous mixtures are known to contain compounds which are absorbed from the mixture into the solvent along with the acetylene. Such compounds include gases, such as CO, $O_2$ and $CO_2$, paraffins, olefins aromatic and polycyclic hydrocarbons, and acetylenic substances such as vinyl acetylene, methyl acetylene, di-vinyl acetylene, tri-acetylene, and di-acetylene. The acetylenic substances, as well as the other highly reactive substances, when in the solvent, form polymers which precipitate and deposit on the surfaces of the equipment.

The deposits foul the equipment necessitating shut down of operations and costly maintenance operations to remove the fouling deposits.

Fouling is usually evidenced by a decrease in the heat transfer coefficient of reboilers which are used to heat solvent to complete removal of absorbed acetylene in, for example, a vacuum tower and/or an increase in solvent passage pressure drop for solvent heat exchangers which are used to recover heat from the main solvent stream; for example, solvent from the hot stripped solvent which after sufficient cooling is recycled to the absorber. Decrease of pressure and/or increase of temperature are commonly used to remove the acetylene and other compounds from the solvent.

The instant invention inhibits fouling of equipment during solvent recovery of acetylene from gaseous mixtures.

Briefly stated, the present invention comprises the method of substantially eliminating fouling of the equipment during solvent recovery of acetylene from acetylene-containing gaseous mixtures by incorporating in the solvent an effective soluble amount of an antifouling agent selected from the group consisting of alkali metal salts of acids having a maximum dissociation constant of $10^{-4}$ for the first hydrogen and alkali metal hydroxides.

As to materials, the solvent system used may be any one capable of dissolving acetylene. Preferred are di-methyl formamide, butyrolactone, and N-methylpyrrolidone. Examples of other suitable solvents are set forth in U.S. Patent No. 2,719,601. As ordinarily used, the solvent system in the recovery cycle also contains minor proportions of water, usually no greater than about 8% by weight.

The critical feature of the invention is the antifouling agent. It must be substantially nondestructive of the solvent to which it is added and soluble therein to an extent sufficient to cause dispersion of polymers in the solvent and substantially eliminate deposition of the polymer on the surface of the recovery equipment. The antifouling salts that can be used are the alkali metal salts of acids having a maximum dissociation constant of $10^{-4}$ for the first hydrogen (cf. Handbook of Chemistry and Physics, 23rd ed., 1959); preferably salts of carbonic acid and unsubstituted $C_1$–$C_{18}$ fatty acids. Specific examples of suitable salts are sodium carbonate, sodium acetate, potassium carbonate, sodium bicarbonate, sodium stearate, sodium oleate and sodium succinate. Examples of suitable antifouling hydroxides are sodium hydroxide and potassium hydroxide. Of all the antifouling agents, sodium carbonate is preferred because of its effectiveness, complete lack of reactivity with acetylenic solvents, ready availability and low cost.

As to proportions, the amount of antifouling agent added to the solvent will vary dependent upon the particular solvent used, particularly on the amount of water in said solvent system, and hydrocarbon feedstock from which the gaseous mixture is prepared. Ordinarily, the amount of agent will vary from about 10 p.p.m. to about 600 p.p.m.; i.e., 10 to 600 parts of agent per million parts of solvent system. Larger amounts may be used in some instances, but it is not preferred to do so because of possible adverse effects on the effectiveness of the solvent system. For each system used the effective concentration limits of the agent can best be determined by actual plant operation. An indication of effectiveness is the hereinbelow described test for polymer dispersion.

A control is prepared by having 300 grams of solvent placed in a stoppered flask and held at 235° F. in a constant temperature bath. A continuous stream (5 cubic feet per hour) of acetylene containing gaseous mixture is bubbled through the solvent for 12 hours by means of a tube extending through an opening in the stopper. A second opening is provided in the stopper to which is attached an air cooled condenser to prevent solvent loss while maintaining the system at about atmospheric pressure. Polymers are formed in the solvent to an extent dependent upon the specific quantities of compounds other than acetylene present in the gaseous stream and the total amount of gas passed through the system; normally, about ½ to 2 weight percent. 100 grams of solvent containing the suspended polymer is mixed with 900 grams of distilled water and heated for 10 to 15 minutes at 100° C. The contents of the flask are then filtered through a Buckner funnel having thereon filter paper with a pore opening of about 4 microns (No. 4 Whatman filter paper). The filter paper containing the residue is dried in an oven at 125° C. and the weight of polymer remaining on the filter paper is determined. In this control test most of the polymer remains on the filter paper.

A series of tests are carried out at the same time as the control and are identical thereto except that varying concentrations of antifouling agent ranging from 10 p.p.m. to 600 p.p.m. are added to the solvent prior to the introduction of the gaseous stream. Polymers will still be formed to the same degree, but when an effective proportion of antifouling agent is present most of the polymer remains in a finely divided state and passes through the filter paper when filtered through in a Buckner funnel in the test previously described. With proper agent addition the polymers remain dispersed. Consequently results of the test indicate the approximate proportions of agent to be used.

The preparation of acetylene-containing gaseous mixtures is well-known and does not form part of the instant invention. They can be prepared by any high-temperature decomposition (arc cracking or thermal cracking) of hydrocarbon feedstocks such as methane, natural gas and naphtha, or by partial combustion of such feedstocks in the presence of oxygen.

In like manner, recovery of the acetylene from the gaseous mixtures by solvents is also known and is illustrated, for example, in U.S. Patents No. 2,719,601 and 2,738,860. In brief, such procedures comprise absorbing the acetylene from the mixture with a selective solvent for acetylene and then flashing and stripping the acetylene from the solvent. This may be done by increasing the solvent temperature and/or decreasing the solvent system pressure and by countercurrent contact of the acetylene-rich solvent with flashed vapors arising from less acetylene-rich sections of the solvent system. The instant invention has application to any of these recovery procedures since fouling can occur in any of them. The agent can be added to the solvent at any point; preferably in the acetylene recovery cycle.

While the salt may be added as such to the solvent it is preferred to form an aqueous mixture of the antifouling agent. The mixture is added to the solvent to give the proper concentration of dispersant, but care must be taken not to add water in an amount sufficient to cause troublesome flocculation of polymer in the system.

Normally, an aqueous solvent mixture is produced as a consequence of the acetylene recovery and purification process. Such a mixture may, for example, be the result of water washing gaseous streams leaving the solvent system to recover their valuable solvent content or the result of condensation from gaseous streams originating within the solvent system, but not emanating therefrom. The method of returning such aqueous solvent streams to the solvent system is most important since the high water content of the streams tends to flocculate polymer at and immediately downstream of the point of admixture. The instant invention recognizes this aqueous solvent stream to be a very effective media for carrying the antifouling agent into the main solvent system stream, and furthermore recognizes the value of achieving thereby a maximum concentration of the antifouling agent at this critical point of admixture of returned weak solvent into the main solvent system stream.

The invention will be further illustrated by description in connection with the following specific examples of the practice of it. Parts are expressed as parts by weight unless specifically stated to the contrary.

EXAMPLE 1

The test as described above was run with N-methylpyrrolidone as solvent, sodium carbonate as the antifouling agent, and the gas being cracked gas obtained by partial oxidation of methane with oxygen. It was found that the addition of 50 to about 200 p.p.m. of sodium carbonate inhibited fouling and that 80 p.p.m. of sodium carbonate was optimum. Actual plant runs were then made using the same solvent system, salt, and gas as described below.

57,000 m.³ (Standard Temperature and Pressure) per hour of the cracked gas was washed countercurrently with 345 m.³ per hour of N-methylpyrrolidone containing 2½% water in an absorption column at 9.4 atm. The acetylene contained in the cracked gas was withdrawn from the bottom of the column as a solution in N-methylpyrrolidone; the residual gas free from acetylene left at the top of the column. Small amounts of constituents less soluble than acetylene were removed from the laden solvent by flashing to 1.2 atm. The dissolved acetylene was heated to 100° C. and then stripped from the solvent in two steps: in the first step at a pressure of 1.25 atm. and in the second at a pressure of 0.2 atm. Subsequently those constituents of the cracked gas which are more soluble than acetylene and the water absorbed were removed from the N-methylpyrrolidone by boiling at 0.2 atm. The heat required for this was supplied by a reboiler.

The degassed N-methylpyrrolidone was cooled and reused for absorption of acetylene.

Polymers that formed in the solvent cycle were removed from the unit by continuous distillation of a slip stream of approximately 2.5 m.³ per hour. A steady-state polymer concentration was set up in the solvent cycle of about ½ to 2% by weight of solvent.

The polymers have a tendency to form deposits on the walls of the apparatus and for example to gradually decrease the heat transfer of the said reboiler so that the latter must be cleaned from time to time.

By way of example, the heat transfer coefficient of the circulation heater decreased within 9 days from 1,000 Kcal.·m.$^{-2}$·h$^{-1}$·°C.$^{-1}$ to 278 Kcal.·m.$^{-2}$·h$^{-1}$·°C.$^{-1}$. Other heat exchangers in the solvent cycle suffer significant loss in heat transfer efficiency and incurred significantly increased solvent passage pressure drop.

The reboiler was cleaned and then put into operation again. Approximately 4 kg. per hour of a 5% aqueous sodium carbonate solution was supplied continuously to the solvent cycle. In this way, a steady-state concentration of approximately 80 p.p.m. of $Na_2CO_3$ was set up in the circulating solvent.

By the time this concentration was reached, the heat transfer rate of the reboiler had dropped from 975 Kcal.·m.$^{-2}$·h$^{-1}$·°C.$^{-1}$ to 680 Kcal.·m.$^{-2}$·h$^{-1}$·°C.$^{-1}$ within three days. The initial drop in heat transfer coefficient is the normal one due to establishment of an initial film coefficient; it is not be confused with fouling which is evidenced by a subsequent drop in the heat transfer coefficient. It then slowly decreased to $$560 \text{ Kcal.·m.}^{-2}\text{·h}^{-1}\text{·°C.}^{-1}$$

within 60 days and remained essentially constant thereafter. At the end of 120 days there was no need to clean the reboiler and furthermore there was no significant increase in pressure drop across the reboiler solvent passages.

The other heat exchangers present in the cycle behaved in a similar way and did not need cleaning either.

EXAMPLE 2

The cracked gas mentioned in Example 1 and obtained by partial oxidation was washed in N-methylpyrrolidone containing 2½% water for the purpose of recovering acetylene under the same conditions as indicated in Example 1. The dissolved acetylene was set free in the same way as described in Example 1.

Ahead of the point where the solvent freed from acetylene was passed into the reboiler, a slip stream of 220 liters per hour of solvent was withdrawn and pass through a heat exchanger. The heat source was steam condensing at 140 p.s.i.g. and the initial exit solvent temperature was approximately 275° F. The heat transfer coefficient of the heat exchanger dropped from $$180 \text{ Kcal.·m.}^{-2}\text{·h}^{-1}\text{·°C.}^{-1}$$

to 80 Kcal.·m.$^{-2}$·h$^{-1}$·°C.$^{-1}$ within 24 hours.

After the heater had been cleaned, the process was carried out in the same way except that a mixture of 2 g. of sodium stearate, 98 g. of water and 900 g. of N-methylpyrrolidone was continuously metered into the 220 liters per hour solvent stream ahead of the heater at a rate of 11 liters per hour.

Thus, the concentration of sodium stearate at the entrance of the heater was 100 p.p.m.

Under these conditions the heat exchange rate of the heater remained practically constant showing polymer deposition was inhibited.

EXAMPLE 3

The test for polymer dispersion described above was run using the antifouling agents listed below. The agents all dispersed the polymers formed in the parts per million shown.

|  | p.p.m. |
|---|---|
| Sodium carbonate | 100 |
| Sodium hydroxide | 80 |
| Potassium hydroxide | 110 |
| Sodium acetate | 300 |
| Potassium carbonate | 300 |
| Sodium bicarbonate | 300 |
| Sodium stearate | 600 |
| Sodium succinate | 300 |

The procedure and composition of Example 2 are used except that the sodium stearate there used is replaced separately and in turn by each of the antifouling agents listed above in the proportion shown. In each case polymer deposition is inhibited.

In conjunction with the test for polymer dispersion discussed above the following screening test method can be used: A sample of about 500 ccm. fresh solvent, which is free of polymers and antifouling agent, is contacted with a continuous stream of acetylene containing gaseous mixture as described in the above test until the polymer content reaches 1–2% by weight. 100 ccm. of this solution are diluted with water to form a mixture containing 10% by weight of water. A metal Raschig ring is placed into this solution and the test solution is heated in a closed container at 100° C. for 10 hours. The quantity of deposits formed on the ring are a measure for the effectiveness of the antifouling agent used. The greater the deposit the less effective the agent.

While the exact theory is not understood, it is believed that the agents of the present invention release ions that neutralize the charge present on the polymers thereby inhibiting their deposition on the surfaces of the equipment used in the solvent recovery cycle. Measurements show that the agents do not measurably affect the amount of polymers formed.

It will be understood that it is intended to cover all changes and modifications of the examples of the invention herein chosen for the purpose of illustration which do not constitute departures from the spirit and scope of the invention.

What is claimed is:

1. In the process for recovery of acetylene from acetylene-containing gaseous mixtures by the use of an organic solvent capable of dissolving acetylene, the method of substantially eliminating deposition of polymers found in said solvent onto the surrounding surfaces comprising the step of adding to said solvent an effective soluble amount of from about 10 to about 600 p.p.m. of an antifouling agent selected from the group consisting of alkali metal salts of acids having a maximum dissociation constant of $10^{-4}$ for the first hydrogen and alkali metal hydroxides.

2. The process of claim 1 wherein the antifouling agent is an alkali metal carbonate.

3. The process of claim 2 wherein the alkali metal carbonate is sodium carbonate.

4. The process of claim 1 wherein there is added to the solvent from about 50 to about 200 p.p.m. of sodium carbonate.

5. In the process for recovery of acetylene with N-methylpyrrolidone from cracked gas obtained by partial combustion of natural gas in the presence of oxygen, the method of substantially eliminating deposition of polymers found in the N-methylpyrrolidone onto the surrounding equipment surfaces comprising the step of adding to the N-methylpyrrolidone an effective soluble amount sufficient to substantially inhibit polymer deposition without substantially affecting the N-methylpyrrolidone, of an antifouling agent selected from the group consisting of alkali metal salts of acids having a maximum dissociation constant of $10^{-4}$ for the first hydrogen and alkali metal hydroxides.

6. In the process for solvent recovery of acetylene with N-methylpyrrolidone from cracked gas obtained by partial combustion of natural gas in the presence of oxygen, the method of substantially eliminating deposition of polymers found in the N-methylpyrrolidone onto the surrounding equipment surfaces comprising the step of adding to the N-methylpyrrolidone an effective soluble amount sufficient to substantially inhibit polymer deposition without substantially affecting the N-methylpyrrolidone, of an alkali metal carbonate.

7. In the process for recovery of acetylene with N-methylpyrrolidone from cracked gas obtained by partial combustion of natural gas in the presence of oxygen, the method of substantially eliminating deposition of polymers found in the N-methylpyrrolidone onto the surrounding equipment surfaces comprising the step of adding to the N-methylpyrrolidone an effective soluble amount sufficient to substantially inhibit polymer deposition without substantially affecting said N-methylpyrrolidone, of sodium carbonate.

8. In the process for recovery of acetylene with N-methylpyrrolidone from cracked gas obtained by partial combustion of natural gas in the presence of oxygen, the method of substantially eliminating deposition of polymers found in the N-methylpyrrolidone onto the surrounding equipment surfaces comprising the step of adding to the N-methylpyrrolidone from about 50 to about 200 p.p.m. of sodium carbonate.

References Cited

UNITED STATES PATENTS

| 2,742,517 | 4/1956 | Fusco. |
| 2,964,131 | 12/1960 | Campbell. |
| 3,002,586 | 10/1961 | Rabourn _____ 55—65 X |

REUBEN FRIEDMAN, *Primary Examiner.*

JOHN ADEE, *Assistant Examiner.*